(12) United States Patent
Frankel et al.

(10) Patent No.: US 12,694,138 B2
(45) Date of Patent: Jul. 28, 2026

(54) DATA PACKET SHARDING FOR SECURE NETWORK TRANSMISSION

(71) Applicant: CIENA CORPORATION, Hanover, MD (US)

(72) Inventors: Michael Y. Frankel, Hallandale Beach, FL (US); James Carnes, Baltimore, MD (US); Vladimir Pelekhaty, Baltimore, MD (US)

(73) Assignee: CIENA CORPORATION, Hanover, MD (US)

( * ) Notice: Subject to any disclaimer, the term of this patent is extended or adjusted under 35 U.S.C. 154(b) by 321 days.

(21) Appl. No.: 18/179,860

(22) Filed: Mar. 7, 2023

(65) Prior Publication Data

US 2024/0303354 A1     Sep. 12, 2024

(51) Int. Cl.
| | |
|---|---|
| *G06F 21/62* | (2013.01) |
| *H04L 9/08* | (2006.01) |
| *H04L 45/02* | (2022.01) |
| *H04L 45/24* | (2022.01) |

(52) U.S. Cl.
CPC ........ *G06F 21/6209* (2013.01); *H04L 9/0822* (2013.01); *H04L 45/02* (2013.01); *H04L 45/24* (2013.01)

(58) Field of Classification Search
CPC ... G06F 21/6209; H04L 9/0822; H04L 45/02; H04L 45/24
See application file for complete search history.

(56) References Cited

U.S. PATENT DOCUMENTS

| | | | | |
|---|---|---|---|---|
| 7,242,776 B1 * | 7/2007 | Elliot | ..................... | G06F 7/588 |
| | | | | 380/278 |
| 2003/0149869 A1 * | 8/2003 | Gleichauf | ............... | H04L 45/50 |
| | | | | 713/153 |
| 2016/0191509 A1 * | 6/2016 | Bestler | ................ | H04L 63/0876 |
| | | | | 713/193 |
| 2016/0241577 A1 * | 8/2016 | Johnson | ................ | G06F 16/278 |
| 2017/0353232 A1 * | 12/2017 | Atkinson | .............. | H04L 1/0009 |
| 2019/0306135 A1 * | 10/2019 | Mudulodu | .......... | H04L 63/0435 |
| 2021/0157641 A1 * | 5/2021 | Parsa | .................... | G06F 9/4881 |
| 2021/0160286 A1 * | 5/2021 | Williams | ............... | H04L 63/18 |
| 2021/0243256 A1 * | 8/2021 | Checco | .................. | H04L 63/08 |

OTHER PUBLICATIONS

"NIST Announces First Four Quantum-Resistant Cryptographic Algorithms", https://www.nist.gov/news-events/news,4 pp., Jul. 5, 2022.
"Raptor Code", Wikipedia, https://en.wikipedia.org/wiki/Raptor_code, 2022, 4 pp.

(Continued)

*Primary Examiner* — Vance M Little
(74) *Attorney, Agent, or Firm* — Guntin & Gust, PLC; John G. Rauch

(57) ABSTRACT

Aspects of the subject disclosure may include, for example, receiving one or more blocks of data for transmission to a destination, splitting the one or more blocks of data into a plurality of data shards, and communicating the plurality of data shards to the destination, wherein the communicating comprises providing a respective data shard of the plurality of data shards to a respective physical path of a plurality of physical paths to increase data security during the communicating. Other embodiments are disclosed.

20 Claims, 7 Drawing Sheets

(56) References Cited

OTHER PUBLICATIONS

Chan, Calvin , et al., "Physical-layer network coding in optical networks", Conference Paper Jul. 2013, Dept. of Information Engineering, The Chinese University of Hon Kong, Shatin, N.T., Hong Kong SAR, China, 5 pages.

Cohen, A. , et al., "AES as Error Correction: Cryptosystems for Reliable Communication", Mar. 22, 2022, 6 pp.

Cohen, A. , et al., "Network Coding-Based Post-Quantum Cryptography", Research Laboratory of Electronics, MIT, Cambridge, MA, USA, 28 pp., Sep. 2020.

Cohen, A. , et al., "Partial Encryption after Encoding for Security and Reliability in Data Systems", Feb. 7, 2022, 7 pp.

Deierling, K. , "What Is a DPU?", Nvidia Blog, https://blogs.nvidia.com/blog/2020/0520/whats-a-dpu-data-processing-unit/, 18 pp., May 20, 2020.

Drake, M. , "Understanding Database Sharding | DigitalOcean", DigitalOcean, https://www.digitalocean.com/community/tutorials/understanding-database-sharding, 19 pp., Feb. 7, 2019.

El Rouayheb, S. , et al., "Secure Network Coding for Wiretap Networks of Type II", IEEE Transactions on Information Theory, 24 pp., Jul. 2009.

Liew, S. , et al., "Physical-layer network coding: Tutorial, survey, and beyond", Physical Communication, Apr. 25, 2011, 39 pp.

Maymounkov, P. , et al., "Methods for Efficient Network Coding", University of Illinois at Urbana-Champaign, Coordinated Science Laboratory and Department of Computer and Electrical Engineering, 44th Annual Allerton Conference on Communication, Control, and Computing 2006—Monticello, United States, 2006, pp. 482-491.

Medard, M. , et al., "Network Coding Mythbusting: Why It Is Not About Butterflies Anymore", IEEE Communications Magazine • Jul. 2014, 20 pp.

Ozarow, L.H. , et al., "Wire-Tap Channel II", At&T Bell Laboratories, Springer-Verlag, 1998, 18 pp.

Pertin, D. , et al., "Comparison of RAID-6 Erasure Codes", The third Sino-French Workshop on Information and Communication Technologies, SIFWICT 2015, Jun. 2015, Nantes, France., 7 pp.

Vajha, M. , et al., "Clay Codes: Moulding MDS Codes", The Advanced Computing Systems Association, Proceedings of the 16th USENIX Conference on File and Storage Technologies, Feb. 12-15, 2018 • Oakland, CA, USA www.usenix.org/conference/fast18/presentation/vajha, 16 pp.

Int'l Search Report & Written Opinion for PCT/US2024'018608 mailed May 7, 2024, 11 pp.

International Preliminary Report on Patentability for PCT/US2024/018608 mailed Sep. 18, 2025.

* cited by examiner

RECEIVE PACKET OF FRAME DATA —202

PROCESS THE BLOCK INTO N INDIVIDUAL CELLS FOR SEPARATE ROUTING USING KEY-BASED SPLITTING ALGORITHM —204

APPLY MULTI-PATH DIGITAL ENCRYPTION OR HASH SIGNATURE TO A SUBSET OF CHANNELS —206

APPLY NETWORK ERROR CORRECTION CODING LAYER —208

APPLY LABELS TO N CELLS TO FORCE USE OF DIVERSE PATHS —210

TRANSMIT CELLS —212

END —216

200

300

360

DATA PACKET SHARDING FOR SECURE NETWORK TRANSMISSION

FIELD OF THE DISCLOSURE

The subject disclosure relates to secure transmission of data over a network.

BACKGROUND

It is an accepted practice to encrypt data prior to transmission to preserve data integrity and confidentiality. Data integrity and confidentiality are critical, and adversaries are becoming more numerous and sophisticated with ever improving eavesdropping and decryption techniques.

BRIEF DESCRIPTION OF THE DRAWINGS

Reference will now be made to the accompanying drawings, which are not necessarily drawn to scale, and wherein.

DETAILED DESCRIPTION

Figure 1A:
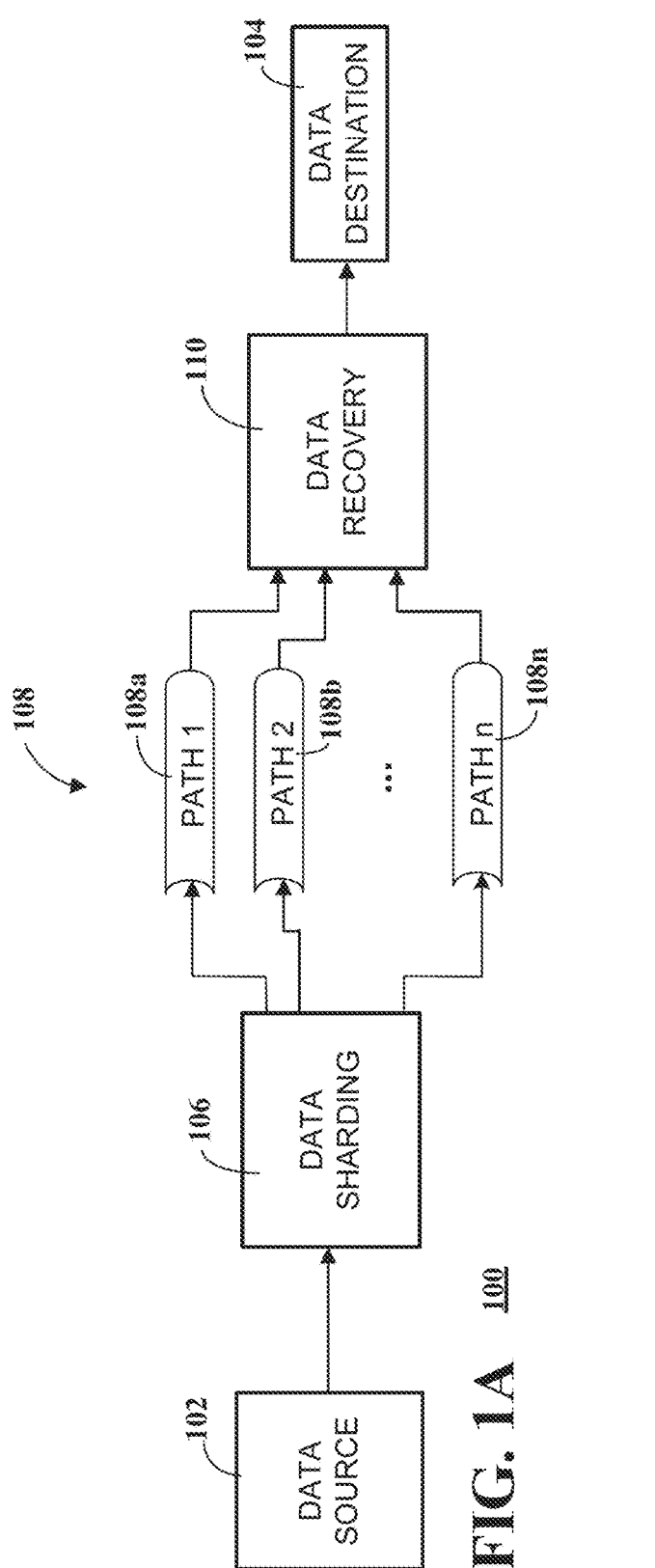
FIG. 1A is a block diagram illustrating an exemplary, non-limiting embodiment of a communications system in accordance with various aspects described herein.

The subject disclosure describes, among other things, illustrative embodiments for splitting data into cells or shards for transmission to a remote destination. The act of splitting the data into cells or shards provides improved data integrity and confidentiality during transmission. The data shards are communicated over a diverse set of physical paths between transmitter and receiver, such as in a data center, in Metropolitan Area or Wide Area networks. The diverse physical paths may include physically separate conductors or optical fibers for the data shards. Alternatively, the diverse physical paths may include separate resources such as diverse optical wavelengths in an optical fiber or diverse modes in a multimode communication system. Still further, the diverse physical paths may include diverse radio frequencies on a wireless communication system. Other embodiments are described in the subject disclosure.

One or more aspects of the subject disclosure include receiving data for transmission. Any suitable unit of data, amount of data or Protocol Data Unit (PDU) may be received and processed, including packets (layer 3 of the Open Systems Intercommunication or OSI model), frames (layer 2) and blocks. In some embodiments, the amount of data processed may be random or of any size, or an amount received in a predetermined amount of time such as 500 ms or 1 μs. For example, one or more packets of data may be received for transmission to a destination, the packets being aggregated into blocks. The one or more blocks of data are split into a plurality of data shards and the plurality of data shards is communicated to the destination. The communicating may comprise providing a respective data shard of the plurality of data shards to a respective physical path of a plurality of physical paths to increase data security during the communicating.

One or more aspects of the subject disclosure include receiving source frames of data at a network device, identifying destinations of the source frames of data, accumulating source frames of data having a common destination at a destination network device into one or more blocks of data, forming common blocks of data, and splitting the common blocks of data into a plurality of shards. Aspects of the subject disclosure further include selecting a plurality of diverse network paths for communication of information between the network device and the destination network device, and communicating the plurality of shards over the plurality of diverse network paths for reception of the plurality of shards at the destination network device and for reassembly at the destination network device into received blocks of data, wherein the received blocks of data match the source blocks of data.

One or more aspects of the subject disclosure include receiving, at a destination network device including a processing system, data shards from a diverse plurality of physical links, the data shards transmitted over the diverse plurality of physical links by a source network device, reassembling the data shards into a block of data, the block of data matching a source block of data at the source network device, and communicating the block of data to a destination.

Referring now to FIG. 1A, a block diagram is shown illustrating an example, non-limiting embodiment of a communication system 100 in accordance with various aspects described herein. Communication system 100 may be embodied in the widest variety of embodiments including any system for data communication or transfer between one point and another. Such data communication may be over one or more wireless channels, one or more wireline channels or any combination of wireless and wireline channels. Communication system 100 is particularly adapted for providing improved data integrity and confidentiality during transmission of data from a first location to a second location. For example, communication system 100 can facilitate in whole or in part splitting received data into a plurality of data shards, communicating the data shards over a set of diverse physical paths such as different wavelengths in an optical fiber or different radio frequencies, and reassembling the data shards into the original data. In this way, data intercepted by an eavesdropper and decrypted on a subset of paths is still useless as data from other paths is missing. Even if data from multiple paths is intercepted, unless a reassembly pattern is known, it would be essentially impossible to reconstruct the full data stream. Features such as encryption and error correction may be optionally included to improve security and reliability.

In data communication systems, data integrity and confidentiality are critical, while adversaries are becoming more numerous and sophisticated with ever improving eavesdropping and decryption techniques. Generally, data is communicated wirelessly (e.g., over a radio channel), electronically or optically over one or more media from a source to a destination. The source and destination may be remotely located or may be within a common location maintained by an operator for data storage and processing. Any person or organization who seeks unpermitted access to the data may be considered an adversary. In some instances, adversaries may seek to intercept the communicated data, either to gain access to confidential information or to modify the data for illegitimate reasons. In response, those responsible for data security and integrity have adopted various types of encoding and encryption of data for transfer. An example of encryption is the Advanced Encryption Standard (AES) algorithm. Generally, data is encrypted according to a key at transmission and decrypted upon receipt. Intercepted, encrypted data is generally useless to an adversary.

However, security experts expect that conventional digital encryption, such as AES, can be broken with quantum computers. Data captured today could be stored and decrypted at some later point in time, and still be valuable. Future development of quantum computing for decryption of intercepted and stored data may pose a longer-term threat. One way to mitigate this threat is to introduce Quantum Key Distribution (QKD) allowing for very fast, secure key rotation. However, QKD systems are expensive, fragile, and only work over a single span.

Another approach is signal obfuscation to preclude possible signal capture. For example, such a process may include introducing encryption phase modulation based on a key. This requires optical Coherent Modem modification, and does not work with simpler, low-cost modems, especially ones found inside data centers. Another example process is spread-spectrum signal hopping radio communication. The signal is moved among frequencies in a pattern known to the transmitter and receiver but unknown to possible eavesdroppers. Such approaches generally require complex external equipment to provide the necessary modulation on top of existing signals. This type of approach may not be appropriated, for example, for a data center environment that uses very low cost, simple optical interfaces.

Other known approaches to data security include physical security such as encasing optical cables in concrete as well as adding eavesdropper tap monitoring signals. In another example, digital level data sharding has been proposed as software middleware between an application layer and a transmission control protocol (TCP) channel, with extensive intermediate shard storage. Such storage sharding employs multiple storage locations with separate shards converging onto a single end point. However, this process is known to penalize bandwidth and latency in data communication. This requires tight coordination between a particular customer, such as an application, and network infrastructure provider technology, such as guaranteeing diverse paths, adding intermediate storage sites, etc., and may not be feasible in most contexts.

What is needed is a way to provide a substantially increased level of network security while using already-existing network resources to reduce associated cost, power consumption and implementation complexity. Preferably this may be accomplished without incurring penalties in network metrics such as throughput, latency, etc.

As noted, encrypted data, in any form and in any strength, is susceptible to collection and brute forcing. Brute forcing is the exhaustive process of trial and error to determine every possible key in a given key space. Use of sufficiently random and lengthy keys makes this process with modern computing resources theoretically impractical. However, as compute power increases and the use of new techniques introduced by quantum computers is brought online, the time to exhaust an entire key space is exponentially decreased. Brute forcing will eventually win, given sufficient time and resources. An approach that neutralizes collection and brute forcing is needed.

A solution in accordance with aspects disclosed herein is in programmatically splitting or sharding a unit of data such as a packet, frame or block, or a data flow across multiple distinct physical paths or wavelengths. Sharding may include any suitable operation to reduce a first amount of data to smaller amounts of data for communication or storage. The first amount may be termed the original data. The smaller amounts of data may be termed shards or data shards. The original data may be accumulated in one or more blocks from one or more frames or packets of data intended for communication to a destination. In an example, 1 KB (1024 bytes) or original data may be sharded into two 512 byte shards or four 256 byte shards. In another example, the length in bytes of each shard may be different rather than the same, such as sharding 1 KB into a 256 byte shard and a 768 byte shard. In further examples, the selection of specific data bits for a specific shard or bit length of respective shards may be selected according to any algorithm or according to a specific key. Splitting blocks into shards may be based on a key. For example, if a 1024 bit block is accumulated, a simple sharding may be to just take sequences of 256 bits and assign them to respective shards. However, this effectively keeps plaintext of 256 bits visible. An alternative embodiment uses a key and pseudo-randomly key-based assignment of 256 bits from a block to a specific shard. The same key may be used to decrypt the shards upon receipt. Key-based data association and length for sharding will make reconstruction of the original data more difficult or impossible in the event the shards are intercepted by an unauthorized person. Further, adding key-based randomization to the start of the transmission of the sharded data will make synchronous bulk collection by an adversary across paths or wavelengths impractical. If reconstruction of the sharded encrypted data is attempted, success is computationally impossible as reconstruction of cipher text will not generate a good sample.

This process makes use of the fact that most modern networks have multiple paths between endpoints. A system in accordance with aspects described herein includes two endpoints, an input point and an output point, and several diverse paths that interconnect the endpoints. The endpoints define a security service. The input point will do encoding (optionally) and encryption of a data stream. The output point will decode the data stream, if encoding is used, and decrypt the data stream. The diverse paths provide an additional level of security. Incoming data is broken into smaller shards and sent through diverse paths.

Data sharding can be done at a bit level, in one example. In a system with four diverse paths, the first bit is assigned to a first path; a second bit is assigned to a second path, a third bit in sequence is assigned to a third path and a fourth bit is assigned to a fourth path of the four paths. Subsequent bits in the sequence may be assigned similarly to interleave the bits among the four paths. The output point operates to deinterleave and recover the data from the four paths. Of course, four paths is only an example, and any number of diverse paths may be used. Similarly, the input data can be sharded into shards having any length in bits. Each shard is sent on one path of the several diverse paths.

Figure 1B:
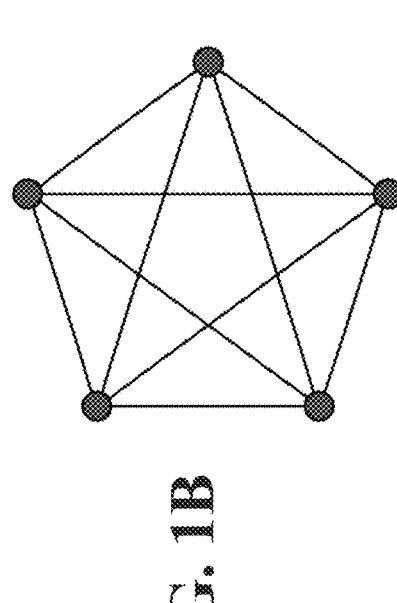
FIG. 1B is an example of a complete graph which may be used to model a network topology.

FIG. 1B is an illustration showing an example of a complete graph. A complete graph is a simple, undirected graph in which every pair of distinct vertices is connected by a unique edge. FIG. 1B shows a complete graph designated $K_5$, indicating the complete graph has 5 vertices. The vertices may model the source or sink or input point and output point of a communication network. Communicating between any two vertices can take a minimum of one hop. However, between any two vertices, there are also three other paths that will deliver data in two hops, from the input point to an intermediate destination to the output point. This is a characteristic of a complete graph. As the number of vertices increases the number of two-hop paths increases.

Thus, applied to a communication network, sharded data can be directed from the input point to the output point in all four different paths of the illustrated complete graph of FIG. 1B, including the one-hop path and the three two-hop paths. If there is a desire for all utilized paths to have identical latency, the path selection may be limited to the three paths that have two hops each. Data may be sharded and sent through different two-hop paths or links between any input point and any output point. An eavesdropper monitoring one link, corresponding to an edge in the complete graph of FIG. 1B, will only see a portion of the data but never get all data in order to store or decode all data. Even if a network may not be modelled as a complete graph, similar considerations apply so that data may be communicated over diverse paths of the network, giving an eavesdropper only potential access to a subset of the data due to the use of the diverse paths.

In some embodiments, additional network resources may be assigned to permit non-uniform latency so that both the one-hop path and the two-hop path (in this simple example) can be accommodated. For example, one-hop packets received at the receiver or output point may be stored until they can be synchronized and time-aligned with the two-hop packets.

In some examples, a key is assigned and used for sharding itself. In that example, the method of interleaving and deinterleaving is itself unknown to the eavesdropper. However, if the eavesdropper seeks to recover a complete dataset, the eavesdropper must monitor a larger number of points. Instead of tapping 1 optical fiber to capture all transmitted data, the eavesdropper must tap n optical fibers or other diverse paths, such as four optical fibers or twenty optical fibers. In another example, the data is sharded across wavelengths. For example, in a submarine system, there may not be enough fibers in the conduit to select multiple fibers for diversity. However, multiple wavelengths within one or more fibers can be selected for diversity. In this example, the eavesdropper may tap a single fiber but would then have to monitor, for example, 80 wavelengths in the fiber to decode a single channel.

By sharding data, if encryption of one particular flow is compromised, such compromising of the data flow does not lead to a compromise of data. Even if all data paths are tapped and stored for collection, brute forcing is no longer possible because decryption is orders of magnitude more difficult. Reassembling packets of partially decrypted flows leads to no useable sequence of bits.

As indicated, embodiments in accordance with the description herein provide splitting or sharding an amount of data such as a data packet or a data flow across multiple distinct physical paths or links or wavelengths. Sharding may include any suitable operation to reduce a first amount of data to smaller amounts of data for communication or storage. The paths or links or wavelengths may generally be referred to as communication resources that may be divided or dedicated to an individual means of communicating data from a source or input point and a destination or an output point. Such resources may include two or more frequencies in a radio communication system or two or more wavelengths in an optical communication system. Such resources may include physical resources such as two or more conductors or wires in an electronic communication system or two or more fibers in a fiber optic communication system. This may be termed spatial channel separation in that each path occupies a respective space or volume for a wire, conductor or fiber. Moreover, any suitable multiple access techniques such as time division multiple access (TDMA) or code division multiple access (CDMA) may be used as well. In a TDMA system, each path or link is assigned a dedicated time slot for communication from the input point to the output point. In a CDMA system, each path or link is assigned a dedicated orthogonal spreading code for communication from the input point to the output point.

In some embodiments, different resources may be mixed for communication or the shards of data. For example, a first set of wires may be selected for communicating a first set of shards of data, and a first set of optical fibers may be selected for a second set of shards of data. Radio resources including different frequencies between a transmitter and receiver may be selected as data paths or links for a group of paths or links, in combination with optical resources such as selected wavelengths within a fiber for a second group of paths or links. A group of paths or links may be a single path so that, for example, all data shards are communicated over separate frequencies in a dense wavelength-division multiplexing (DWDM) system and a single radio channel bearing one data shard may operate in parallel with the optical communication to further separate the one data shard from the remaining data shards to provide further security from eavesdropping. Such a system may be termed a mixed-mode data shard communication system.

Such a mixed-mode data shard communication system must accommodate timing delay and latency variations, however. Delays due to data conversion and transmission through a medium may be substantially different for, for example, radio versus optical versus wireline transmission. Delays may need to be maintained within designated tolerances. Buffering at one end or both ends of a path may be necessary to maintain data alignment in the face of differential delays among the different media. Similar considerations apply to data rate among different media or among different paths. For example, if a 10 Gbps wavelength is used for communicating a data shard in conjunction with a 100 Gbps wavelength for conveying other shards, the 100 Gbps fiber will be able to convey data at a much greater rate than the 10 Gbps fiber, even if delays due to data conversion and media delays are about equal. A process of load balancing may be required in such a situation. For example, shard sizes may be varied such that a larger shard is conveyed through the higher data rate path to better balance communication of the shards.

Different operational methods for sharding data for reliable, secure communications may be adapted to the widest variety of application. For example, a first method employs transmission sharding and encryption across unencrypted links. A second method uses data sharding without encryption across encrypted wavelengths or data flows. A third method uses data sharding with encryption across encrypted wavelengths or data flows. In embodiments, individual technologies and algorithms can be combined in novel ways to achieve increased network data security while reusing existing networking infrastructure and forwarding protocols.

Referring again to FIG. 1A, it shows an exemplary, non-limiting embodiment of a communication system 100. The communication system 100 in the exemplary embodiment includes a data source 102 and a data destination 104, a data sharding module 106, a plurality of physical paths 108, and a data recovery module 110. Oher embodiments may include alternative or additional components and functional elements based on the function and operation of the communication system 100.

The data source 102 may be any element or group of elements containing data to be communicated to data destination 104. In embodiments, the communication system 100 may include portions of a data center where data is collected, stored, processed and distributed. For example, the data source may be a data storage component such as a disk drive which stores data received from another source, and the data destination may be data processing system for processing data. In another example, the data source may be a communications processing system which formats data for communication to a remote location, such as by encoding and packet formation, and the data destination 104 may be a communications interface for converting electronic data to a format for transmission to the remote location, such as by modulation of a radio wave or optical waves in optical fiber, or over a conductor. Data processing may include any suitable operation such as, for example, data conversion, data encoding, data encryption, modulation, etc.

In other exemplary embodiments, the communication system 100 may include portions of a data communication system for conveying data between the data source 102 and the data destination 104 which is remotely located. In such an example, the data source is located at a transmission end of a communication channel and the data destination is located at a reception end of the communication channel. The communication channel my include any radio, optical or wireline path, or combinations of these.

The data sharding module 106 operates to receive original data from the data source and to shard or split the original data from the data source into two or more respective data shards for communication over the physical paths 108 for reception at the data recovery module 110. The data sharding module 106 operates to split or shard a block of data from the data source 102 into multiple shard for separate routing. Each respective data shard is routed over a different respective physical path 108a, 108b, . . . 108n of the physical paths 108. The data recovery module 110 operates to receive the respective shards from each respective physical path 108a, 108b, . . . 108n and to reintegrate the respective shards into data to match the original data from the data source 102. The reintegrated data is provided to the data destination 104 for further processing.

In this manner, the process of data sharding, data communication over different physical paths and reintegration may be implemented in any situation or environment in which data is being conveyed from one location, a source such as the data source 102, to another location, such as the data destination 104. The data source 102 and the data destination 104, may be at the same physical location, such as in a data center. In other examples, the data source 102 and the data destination 104 may be remotely located, with a wireless, wireline or optical data communication channel, covering any distance, located between the data source 102 and the data destination 104.

The data sharding module 106 operates to receive data from the data source 102 and to break the data into n shards or cells for communication over the physical paths 108. Any number n of shards and data paths may be used, generally including 2 or more data paths. More data paths may provide a higher degree of security against interception of data during transmission but may require additional physical resources to drive the physical paths. The data sharding module 106 may include conversion circuitry and other components to convert a first data format, used for example by the data source 102, to a second data format for communication over a selected physical path of the physical paths 108.

Moreover, the data sharding module 106 may include protocol circuitry to format data according to a particular protocol as the data is transmitted. For example, if the physical paths 108 communicate data according to a TCP/IP protocol, the protocol circuitry of the data sharding module 106 may assemble TCP/IP packets for transmission over one or more of the physical paths 108. Similarly, if the communication system 100 is part of a data center that uses Ethernet switches for communications, the protocol circuitry will apply Ethernet frame headers to ensure that the shards follow different paths within the data center. Similarly, if the physical data paths are part of a segment routed network, the protocol circuitry of the data sharding module 106 may apply headers to the data that force the different shards to take different paths through the network. The protocol circuit of the data sharding module 106 ensures that transmitted data is arranged in packets, frames or other structures to match the protocol used by one or more of the physical paths 108. Each physical data path of the physical data paths 108 may use a unique data protocol and the protocol circuitry of the data sharding module 106 will accommodate the requirements of the protocol.

The physical paths 108 may include any combination of physical paths using any data communication technology to convey data from the data sharding module 106 to the data recovery module 110. In a first embodiment, a wavelength division multiplexing (WDM) channel is used to convey data as one or more wavelengths over an optical connection including optical fiber. In this example, a first physical path 108a may include a first fiber and a second physical path 108b may include a second fiber. The data sharding module shards received data into two shards or groups of shards and conveys a first shard or first group of shards over the first fiber, first physical path 108a, and a second shard or second group of shards over the second fiber, second physical path 108b. The first fiber and the second fiber connect the data sharding module 106 and the data recovery module 110. If desired, additional fibers may be used and received data can be sharded or divided into greater numbers of shards. Alternatively, a first physical path 108a may include a first wavelength and a second physical path 108b may include a second wavelength in either the same or second fiber. The data sharding module shards received data into two shards or groups of shards and conveys a first shard or first group of shard over the first wavelength, first physical path 108a, and a second shard or second group of shards over the second wavelength in either the same or second fiber, second physical path 108b.

In a second example, wireless technology may be used to convey data from the data sharding module 106 to the data recovery module 110. The first physical path 108a may include a wireless connection at a first carrier frequency and the second physical path 108b may include a wireless connection at a second carrier frequency. Further, more than two frequencies may be used and assigned to additional physical paths 108, up to n physical paths and physical paths 108n. Still further, any differential multiplexing or coding technique may be used for the multiple wireless connections, such as different respective phase offsets for each respective physical path or different time respective slot assignments for each respective physical path.

In embodiments, each of the data sharding module 106 and the data recovery module 110 may be incorporated in a network device for communication over a network. Examples of such network devices include a network interface card (NIC) in a datacenter, a switch or a router. Any device that has sufficient programmable resources may incorporate an instance of the data sharding module 106 or an instance of the data recovery module 110. Generally, the data sharding module 106 and the data recovery module 110 will be instantiated together in a device such as a network interface card in order to provide secure, two-way data communication.

In embodiments, the data sharding module 106 may include highly programmable hardware that allows definition of new operations on data at wire speed. Examples for the hardware can include field programmable gate arrays (FPGAs) that are custom developed for the function. Other examples include Data Processing Units (DPU). Examples of suitable DPU devices include the BlueField device available from Nvidia Corporation and Infrastructure Processing Units (IPU) available from Intel Corp. A further example is Protocol Independent Switch Architecture (PISA) programmable switches. Other suitable hardware devices and combinations of hardware and software may be used as well. In some embodiments, the data sharding module 106 and the data recovery module 110 may be embodied in one or more software modules that may be incorporated with a network element such as a NIC in a switch, router or other device.

In embodiments, the data sharding module 106 and the data recovery module 110 rely on an agreement or a standardized arrangement for sharding, transmission and recovery of data. For example, the agreement or standard may specify the size of shards produced by the data sharding module 106 as well as interleaving of data shards among the physical paths 108. Further, the agreement or standard may specify some ordering feature for the shards to assist in reordering the data shards upon receipt. For example, each shard may include a header with predefined data. The header data for each shard may include a time stamp corresponding to a sharding time or a transmission time, with each shard having a unique time stamp. In another example, the header for each shard may include a sequence number or other data identifying correct ordering of the data shards. The header may further include an identification of a block with which the shard is associated so that, upon reconstruction, a block may be reassembled from shards. At the data recovery module 110, the time stamp, the sequence number or any other suitable feature may be used to reassemble the shards received over the different physical paths 108 into a correct order for further processing and communication to the final data destination 104.

In embodiments, the data sharding module 106 and the data recovery module 110 may negotiate features of the data transfer including a number of physical paths 108 to be used, identify the physical paths to be used; agree on a shard size; agree on a shard identifier indicating which block the shard belongs to; select a reordering technique such as time stamp or sequence number; select an encoding technique; select an encryption technique including keys; and any other data communication features. For example, if the data sharding module 106 has collected a block of 1000 bits of original data to be communicated across 20 different paths, the data sharding module 106 may shard the original data into 20 shards of 50 bits each. The 20 shards are communicated. The data recovery module 110 needs to know for each shard which of the 20 shards the shard belongs to. Shards may arrive out of order, so some buffering may be required at the data recovery module 110 to correctly order the received data.

Figure 2:
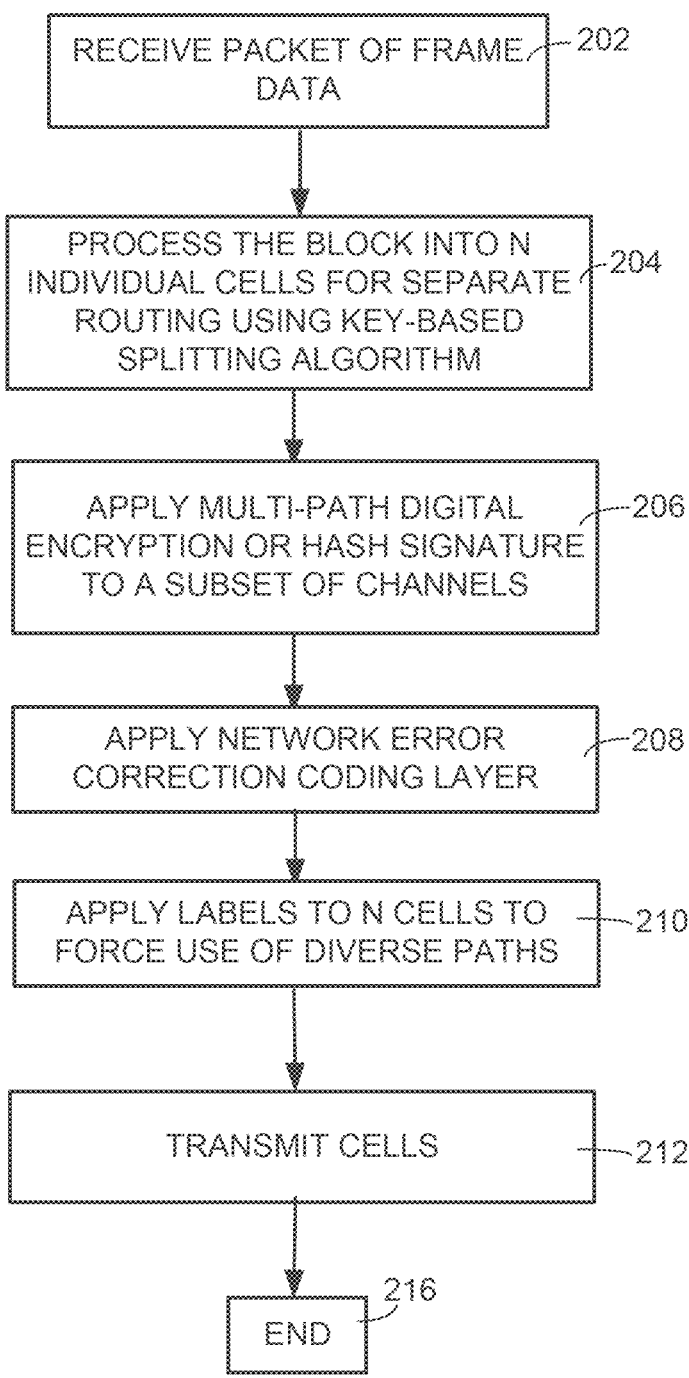
FIG. 2 depicts an illustrative embodiment of a method in accordance with various aspects described herein.

FIG. 2 depicts an illustrative embodiment of a method 200 in accordance with various aspects described herein. The method 200 may be implemented in any suitable device or network elements such as the data sharding module 106 (FIG. 1A). In examples, the method 200 may be implemented in devices in an environment such as a data center in which data must be communicated from one data center element to another.

In other examples, the method 200 may be implemented in devices in a network communication environment in which data must be communicated from a transmitter device to a receiver device over one or more channels of a communication network such as a radio access network, an optical network or a wireline (cable) network.

Further, method 200 may be used to implement a data security service. The data security service may have at least two network endpoints. Each endpoint includes suitable hardware for implementing network transmission data sharding and reassembly functions. The hardware may include any suitable circuitry, software or combination such as a FPGA, a DPU, an IPU, a PISA. The network transmission data sharding process operates in contrast to conventional storage sharding which has multiple storage locations with separate shards converging onto a single end point.

Still further, the method 200 may be used to implement a terminated security service within network end points interconnected by at least two and preferably more separable communication channels or paths or links. In some examples, channel separation can be spatial as in a data center. In other examples, channel separation can be WDM wavelengths, such as in fiber-optic WAN links. In further examples, channel separation can be provided by multiple wireless paths in, for example, cellular networks. Any suitable radio technology may be used, such as fourth generation (4G) cellular, fifth generation (5G cellular), Wi-Fi, Bluetooth and others.

Still further, the method 200 may be used to implement a terminated security service within network end points which performs the data processing sequence illustrated in FIG. 2. The data processing sequence may be implemented in any suitable technology or devices such as FPGA, DPU, IPU, and PISA hardware located inside or adjacent to the network elements.

In the example, the transmitter of data may be termed Alice and the receiver of the data may be referred to as Bob. Any eavesdropper seeking to access the communicated data may be termed Eve. FIG. 2 illustrates processes that may be undertaken at Alice, the transmission end of a channel for communicating data. Similar, complementary processes may be undertaken at Bob, the reception end of the channel for receiving the data for subsequent use at the reception end. In example embodiments, the method 200 may be performed in a device such as one or more data processing elements such as a FPGA, a DPU, an IPU, a PISA or any other suitable hardware component inside the network elements.

In embodiments, prior to receipt of data, two or more channels or paths may be designated for secure data communication from Alice to Bob. Any available resources which may form suitable channels or paths, such as optical frequencies, radio frequencies, and physical paths such as fiber strands or wires in a cable harness, may be designated and assigned for communication. Further, assignment may include configuring circuitry for suitable data conversion and processing, such as conversion from electronic signals to optical signals, assignment of radio channels, and so forth.

At block 202, the device at Alice receives data for communication to Bob. The data may be configured in any suitable format such as raw data or data organized as one or more TCP frames or packets of frame data. In the example where data is organized by frames, each frame may include a payload and a header defining a destination for the packet. The data including header and payload, may be organized in any suitable fashion such as a predefined number of bytes or predefined data fields. At least some of the packets received at Alice are designated for delivery to Bob.

At block 202, Alice accumulates received packets together into larger blocks of data for further processing. Any suitable maximum block size may be used, such as 1000 bits or 1000 bytes. In some examples, a timer may be set to control accumulation of data. If a quantity of data matching the maximum block size is not received during the duration of the timer, the timer may time out and control proceeds to block 204 to process a less than full block of data. Otherwise, when the amount of data reaches the maximum block size, control proceeds to 204.

At block 204, each block of data is processed separately. Each block of data accumulated at block 202 is processed into n individual cells of data. The cells correspond to shards of data, and cells and shards may be used equivalently. Shards of any size including a random size may be used. In examples, a header may be combined with a payload of data of the shard. The header may include any suitable information such as a sequence number or time stamp or both to permit correctly-ordered reassembly at the receiver. The header may further include identification information for the block of data from which the shard was formed.

Further, any algorithm for splitting or sharding the received data into the shards of data may be used. In an example embodiment, a key-based interval splitting algorithm may be implemented. Key splitting is a process in which a segment of data is divided into parts and encrypted at different locations to avoid unauthorized reconstitution (by Eve, for example), even if one part is intercepted and analyzed. For example, keys such as secret keys may be used to specify how intervals will be partitioned in each iteration of an arithmetic code. The keys may specify or define positions where the intervals are split. The shard of data is encoded at Alice using a key and subsequently decoded at Bob using the same key. The key-splitting process enables subsequent, simpler encryption prior to data transmission.

At block 206, method 200 includes application of multi-path digital encryption or a hash signature for integrity verification. In embodiments, such encryption is applied to a small subset of channels. Any suitable number of channels may be selected. For example, if the original data is sharded or split into four shards, two channels may be selected for encryption. Even a single encrypted channel may be suitable. This is different from conventional encryption which is applied to every channel independently.

Further, since the encryption being applied at block 206 according to the method 200 is relatively less resource intensive than other channel encryption, a quantum-resistant encryption algorithm may be selected. Such algorithms are published by, for example, the National Institute of Standards and Technology of the United States government and are designed to withstand attempts to decrypt information by a future quantum computer. Conventional encryption techniques use either or both symmetrical or asymmetrical encryption techniques include AES or RSA based systems. However, a quantum computer may be able to overcome such traditional systems. Accordingly, quantum-resistant encryption uses structured lattices or hash algorithms or other techniques.

In some embodiments, block 206 may include determining a hash signature for one or more channels. For example, a secure cryptographic hash function may be applied at Alice to data of one or more channels. The hash signature may be communicated from Alice to Bob. The received hash signature at Bob may confirm that the data has not been altered during transmission from Alice.

At block 208, a network error correction coding layer may be applied to one or more channels. Such error correction coding can help deal with occasional packet drops or avoid waiting for highly delayed packets. The error correction code enables some portion of transmitted data to be recovered even if some bits are lost or corrupted. Any suitable error correction coding algorithm may be applied.

At block 210, labels may be applied to some number N shards of all the shards to be transmitted. For example, the labels may be used to force the transmitter at Alice to use diverse paths inside data center or in other multi-path networks. Upon transmission of each shard or shard at block 212, the label is used to route the shard to a selected path of the plurality of paths used for communication from Alice to Bob. For example, in a DWDM system, the DWDM terminal can simply direct a shard to a different wavelength transmitter with Bob as end point. In other examples, such as a wide area network, (WAN), method 200 may use segment routing as separate physical channels. In an optical communication system, separate fiber strands and/or wavelengths may be used as separate physical channels. Alternatively, a random spray inside a data center may be used to enforce alternate paths. One goal for using diverse physical paths for communicating the cells or shards is to avoid intermediate network buffering latency as much as possible. As shards are defined for each physical path, the shards are transmitted from Alice, received at Bob and reassembled, preferably with minimal buffering to maintain time alignment. Note that the network paths interconnecting the end points are completely unaware of the additional processing and forward data to the destination per usual protocols.

The shards forming the data are transmitted from Alice to Bob at block 212. At block 214, the method 200 includes determining if there is more data to transmit. If so, control returns to block 202. If not the method 200 ends at block 216. As indicated, FIG. 2 illustrates an embodiment of method 200 for transmitting data at Alice. A similar process, with method steps generally reversed, may be implemented at a receiving end of a channel for receiving data at Bob.

The method 200 operates to prevent or eliminate the likelihood of intercepting data and discovering the data, even using brute force decryption such as with a quantum computer. The method shards or splits up the data across multiple paths so that, even if an eavesdropper captures encrypted data on one path and successfully decrypt the data, the eavesdropper does not successfully gain access to all the data. The possibility of capturing all data from all paths and then successfully decrypting all data is negligible. The method 200 goes beyond protecting the data with just encryption. The method 200 adds the encryption layer across multiple paths to make known attacks on the data infeasible.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3A:
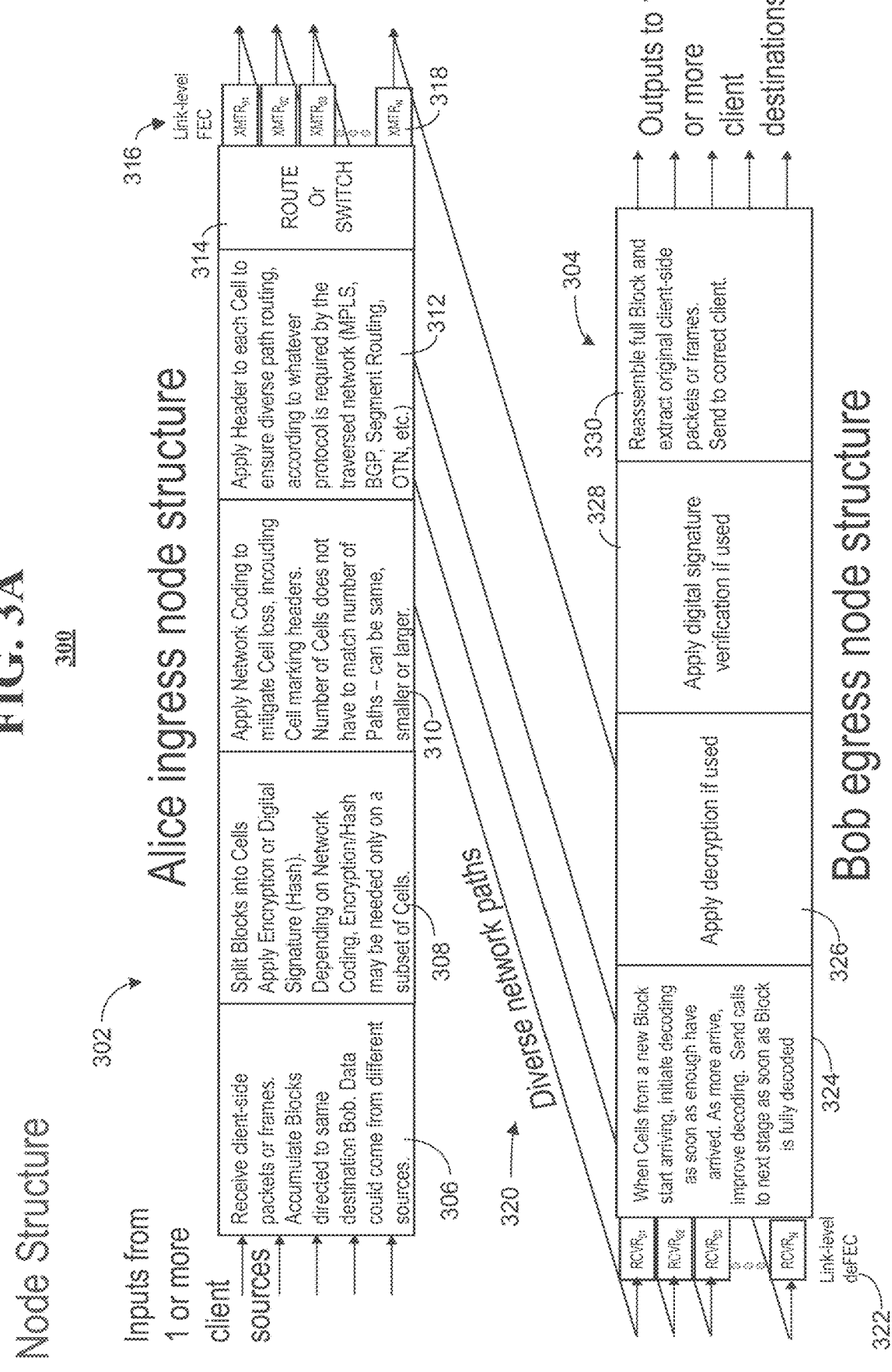
FIG. 3A is a block diagram of an example, non-limiting embodiment of a node structure in accordance with various aspects described herein.

FIG. 3A is a block diagram of an example, non-limiting embodiment of a node structure 300 for an ingress node 302 and an egress node 304 in accordance with various aspects described herein. The node structure 300 illustrates communication of shard data over diverse network paths 320 between the ingress node 302 and the egress node 304. The node structure 300 may be used to convey data from the ingress node 302, indicated as Alice in FIG. 3A, to the egress node 304, indicated as Bob in FIG. 3A. In general, the node structure 300 may be used for sharding or splitting data into multiple cells or shards, communicating the shards over a plurality of network paths to a destination and reassembling the data to an original format. The data sharding process, with communication over multiple diverse network paths, improves security of data communication and reduces likelihood of data interception and recovery by an eavesdropper.

At step 306, client-side packets or frames or other input data is received from one or more client devices at the ingress node 302. Packets or frames are identified by their destination, identified as Bob in the illustrated example, and accumulated with other packets or frames intended for the same destination. In some examples, different data could come from different sources and still be intended for the same destination. The client-side packets at Alice are accumulated as one or more blocks of data. A block of data may have any suitable size.

At step 308, data of the accumulated block is sharded or split into multiple cells, also termed shards. Further, in example embodiments, any suitable encryption or data signature or hashing may be applied to the data prior to transmission. Depending on network coding for the network in which the node structure 300 operates, encryption or hashing algorithm may be needed only on a subset of the cells or shards.

At step 310, in some embodiments, network coding may be applied to the shards in order to mitigate shard loss during transmission and reception. In an example, shards may be equipped with headers to identify the shards and their respective payloads. The shard headers may include sequencing information which may uniquely identify each shard and may include, for example, a timestamp, a sequence number, or a combination of these. The headers, or any other suitable information included with the shards, may assist in identifying lost or delayed shards. Retransmission of lost or mis-ordered shards may be requested by the egress node 304. In embodiments, the number of shards does not have to match, and the number of diverse paths used for communicating the shards from the ingress node 302 to the egress node 304.

At step 312, in some embodiments, a header or suitable information is applied to each shard to ensure diverse path routing during communication from the ingress node 302 to the egress node 304. Any suitable technique or protocol may be used. In one example, multiprotocol label switching (MPLS) may be used for path routing of the cells or shards. MPLS is a routing technique in telecommunications networks that directs data from one node to another based on labels rather than addresses. While network addresses identify endpoints, the labels identify established paths between endpoints. The established paths in the example of FIG. 3A may be the diverse network paths 320 between the ingress node 302 and the egress node 304. Each path may be associated with a label and, as a shard is communicated by the ingress node 302, a switch or router reads the label included in the header and uses the header as an index to determine the destination for the shard.

In another example, border gateway protocol (BGP) may be used for path routing of the cells or shards. BGP is a protocol designed to exchange routing information between autonomous systems and uses TCP as its protocol. BGP peers may be established by manual configuration or any other arrangement between routers or switches. The configuration defines each path of the diverse network paths for data communication of shards between the ingress node 302 and the egress node 304.

In another example, segment routing (SR) may be used for path routing of the cells or shards. Segment routing allows the source node to select a path and places path state information into packet headers at the ingress node 302. In another example, for optical communication, Optical Transport Networking (OTN) may be used for path routing of the cells or shards. OTN includes a digital wrapper that encapsulates frames of data, to allow multiple data sources to be sent on the same channel. Any other suitable technique for associating a particular cell or shard with a particular network path of the diverse network paths 320 may be used.

At step 314, the cells or shards are applied to a router or switch for routing and communication from the ingress node 302 to the egress node 304. The router or switch may make use of the header information applied at step 312 to select the path to the egress node 304. At step 316, any suitable forward error correction technique may be used and applied to the cells or shards.

At step 318, the blocks of data is transmitted over the diverse network paths 320. In embodiments, the diverse network paths 320 may be communication channels within, for example, a network data center. In other embodiments, the diverse network paths 320 may be communication channels between a transmitter and a receiver communicating over a network. The diverse network paths 320 may be any combination of physical resources or paths such as individual optical fibers or wires or cables, or data communication resources such as optical wavelengths or radio frequencies. For example, each particular network path of the diverse network paths 320 may correspond to a particular optical wavelength or frequency.

At step 322, the shards of data are received at the egress node 304. At step 324, when cells or shards start arriving, the egress node 304 begins decoding the shards. For example, the egress node 304 may read header information for each packet or frame of data and locate in the header information a sequence number or time stamp or other sequencing information. The sequencing information may be used to reconstruct the original data in proper sequence at the egress node 304. As soon as a block is fully decoded, the block is passed to step 326.

At step 326 and step 328, the egress node 304 operates to decrypt the block or to verify a digital signature applied to the block, if encryption of the block or a digital signature was used in transmitting the block. In general, a process to reverse any encryption applied at step 308 or to verify the digital signature applied at step 308 is performed at step 326 and step 328. In the illustrated embodiment, at step 326, if the shards are encrypted upon transmission, decryption is applied to retrieve the original data. Similarly at step 328, if digital signature verification was used on the original data, a similar process is used to recover the original data. At step 330, a full block of data is reassembled, and the original client-side packets or frames are reconstructed. Any addressing or other destination information such as in a header of the frame or packet is used to determine the destination for frame or packet. The frame or packet is then communicated to the intended destination.

Figure 3B:
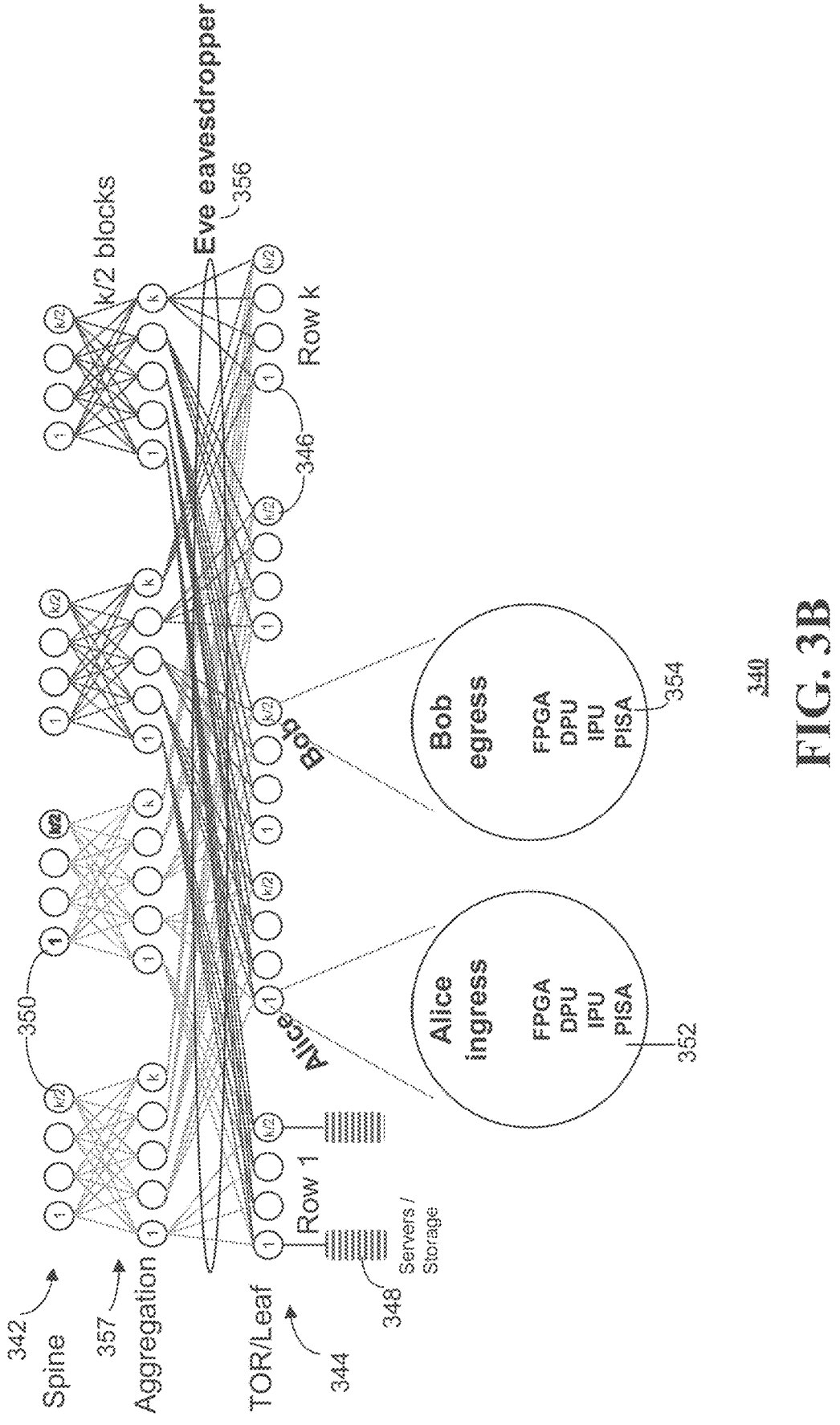
FIG. 3B is a block diagram illustrating an example, non-limiting embodiment of a data center communication system functioning in accordance with the communications system of FIG. 1B and in accordance with various aspects described herein.

FIG. 3B is a block diagram illustrating an example, non-limiting embodiment of a data center communication system 340 functioning in accordance with the communications system of FIG. 1B and in accordance with various aspects described herein. The data center communication system 340 in the example is organized as a spine-leaf architecture. A spine-leaf architecture is data center network topology that consists of three switching layers including a spine layer 342, aggregation layer 357 and a leaf layer 344. The leaf layer 344 includes access switches 346 that aggregate traffic from servers such as server 348 and connect directly into the aggregation layer 357 or network core. Spine switches 350 of the spine layer 342 interconnect all access switches 346 of the leaf layer 344 in a Clos topology.

Data Centers such as the data center communication system 340 of FIG. 3B intrinsically use diverse paths through intermediate switches between end points. Currently, application data is treated as flowlets with packets belonging to a flowlet taking one specific path through the network to prevent out-of-order arrival. Flowlets include sequences of packets, with flowlets separated by sufficient dead time to ensure in-order packet delivery. In the example of FIG. 3B, data is communicated from ingress node 352 designated as Alice to egress node 354 designated as Bob. In the example, the nodes Alice and Bob are both located on the leaf layer 344.

In accordance with features described herein, data in the data center communication system is sharded across paths between the leaf layer 344 and the spine layer 342. Thus, an eavesdropper 356 designated as Eve would have to capture and un-shard data synchronously across the full data center network, followed by attempts at decryption.

Generally, in the data center communication system 340, all data routing consists of at most four hops between source and destination. Generally, one of the nodes in the leaf layer 344 is an input point and another node in the same leaf layer 344 is the output point. The data communication process includes finding multiple paths between the input point and the output point, through the switches of the aggregation layer 357 and switches of the spine layer 342 to the output point. In an actual data center, a link that is illustrated in FIG. 3B as a single line may actually correspond to multiple optical fibers or multiple wavelengths in a fiber and provide multiple paths for shards of data.

In embodiments, all paths from the input point to the output point must be disjoint, meaning no two paths are commonly used for the diverse data paths between the input point and the output point. Two paths may share a common fiber, for example, but must use different wavelengths within the fiber. Similarly, two paths can be assigned to the same wavelength, but the paths must be through two different, unique fibers.

Embodiments of the data center communication system 340 may employ one or more routing options. In a first option, the ingress node 352 may use current per-shard or shard flowlets purely on next hop with local congestion avoidance. In addition, the ingress node 352 may spray shards in a round-robin manner to multiple links or paths on the first hop in order to force some path diversity. However, this may not always guarantee disjoint paths, but the selected paths may be sufficiently different. In a second option, the ingress node 352 may use path-vector protocol to send shard flowlets down disjoint paths. For example, the ingress node 352 may use a protocol such as MPLS, BGP, Segment Routing, etc. That is, the ingress node 352 my use any protocol where headers can be used to specify and enforce diverse paths. In a third option, the same or similar approach could be applied to optical transport networking (OTN) networks, possibly using flexible OTN (FlexOTN) transceiver constructs that allow a more granular handling of individual OTN frames and circuits.

Some data center protocols, such as TCP, may be sensitive to packet drops and latency. Since data packets are sharded across multiple paths, a failure in any one of the paths may affect a data packet. This problem may be addressed by coding such that the egress node 354, designated Bob, does not need to receive all the shards in order to reconstruct the original packet. This is shown quantitatively in FIG. 3C and FIG. 3D. These figures illustrate a benefit of the present disclosure, that sharding combined with coding enhances overall reliability.

In practical data center implementations, the existence of a large differential delay among arriving shards may also be problematic. However, data center paths such as in the data center communication system 340 of FIG. 3B are defined by generally equal or nearly equal hops. Most latency is caused by local network congestion or hot spots. Importantly, congestion is generally caused by large flows occupying a fixed path. Sharding in accordance with aspects described herein inherently spreads traffic much more uniformly across the network paths, keeping loads and delays well balanced. Further, if one of the shards is substantially delayed, packet decoding can proceed without waiting for the late arrival, using for example, Raptor codes. Raptor codes operate to encode a given source block of data consisting of a number k of equal size source symbols into a potentially limitless sequence of encoding symbols such that reception of any k or more encoding symbols allows the source block to be recovered with some non-zero probability. Other codes and encoding techniques may be used, as well.

An example applicable to data center networks is shown in FIG. 3B. Although the example shows a conventional Leaf/Spine topology, the concept applies to any data center or high-performance computing topology that provides multiple paths. The example uses network hardware to implement data sharding, encryption, and reassembly functions. In the example, these functions are most conveniently located in the TOR/Leaf node of the leaf layer 344. In other examples, the same or similar functionality can also be deployed at a network interface card (NIC) of a server such as server 348, using DPU, IPU or FPGA hardware elements. In the example, it is assumed that Alice and Bob are themselves secure, and what may be compromised and exposed to Eve are network interconnect paths, including aggregation switches and switches of the spine layer 342.

In the example, given a TOR/Leaf node such as server 348 with k/2 network-facing port, there are k/2 diverse paths. In this way, data intercepted by Eve and decrypted on a subset of paths is still useless as data from other paths is missing. Even if data from multiple paths is intercepted, unless the reassembly pattern is known, it would be difficult or nearly impossible to reconstruct the full data stream at Eve.

Figure 3C:
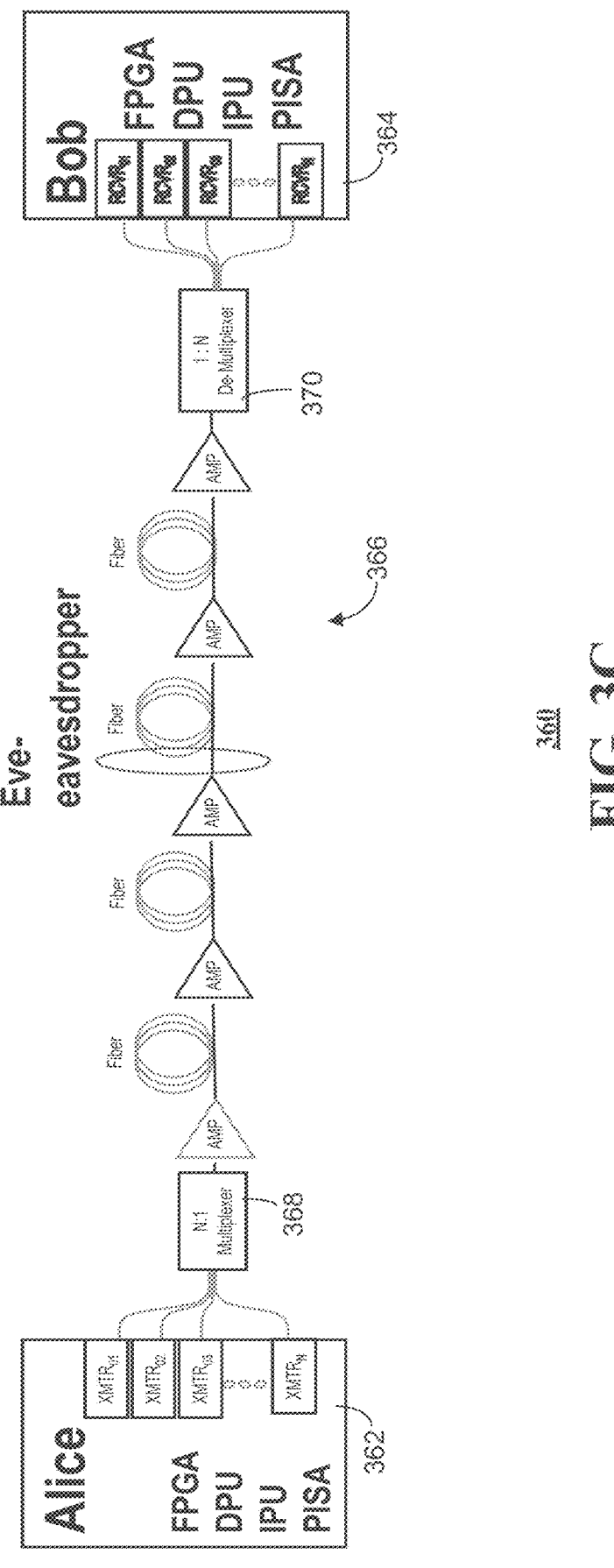
FIG. 3C is a block diagram illustrating an example, non-limiting embodiment of a wavelength division multiplexing communication system functioning in accordance with the communications system of FIG. 1B and in accordance with various aspects described herein.

FIG. 3C is a block diagram illustrating an example, non-limiting embodiment of a wavelength division multiplexing (WDM) communication system 360 functioning in accordance with the communications system of FIG. 1B and in accordance with various aspects described herein. In the WDM communication system 360, ingress node 362 designated as Alice communicates with egress node 364 designated as Bob over an optical network system 366. The egress node 364 generates or produces a plurality of cells or shards of data for communication over the optical network system 366. The plurality of shards is applied to an N:1 multiplexer 368 and combined on one or more optical fibers of the optical network system 366. The optical network system 366 may include one or more optical fibers and one or more optical amplifiers or switches between the ingress node 362 and the egress node 364. In embodiments, all cells or shards may be multiplexed on to a single fiber strand with each cell or shard assigned a respective wavelength in the WDM communication system 360. In other embodiments, a single shard or a subset of the shards may be conveyed over a single fiber. The cells or shards may be mixed among any suitable number of fibers to improve data integrity.

At the egress node 364, the plurality of shards are demultiplexed at demultiplexer 370 and provided to the egress node 364. The egress node 364 operates to decode and decrypt the received data.

In these examples, the ingress nodes 362 and the egress node 364, Alice and Bob, each can be a network function implemented on any suitable platform or hardware. Processing can be implemented in ASICs, FPGA, or DPU/IPU elements or any other suitable hardware components.

In the examples, the encoding transmitter or sharding transmitter is positioned at network ingress node 362 designated Alice. The decoding receiver or recovery receiver is positioned at network egress node 364, designated Bob. A potentially malicious eavesdropper, designated Eve, can be assumed to be weak in cases where only a subset of paths can be intercepted by Eve, or strong in much rarer, more difficult cases where all paths are intercepted by Eve and stored for processing.

Figure 3E:
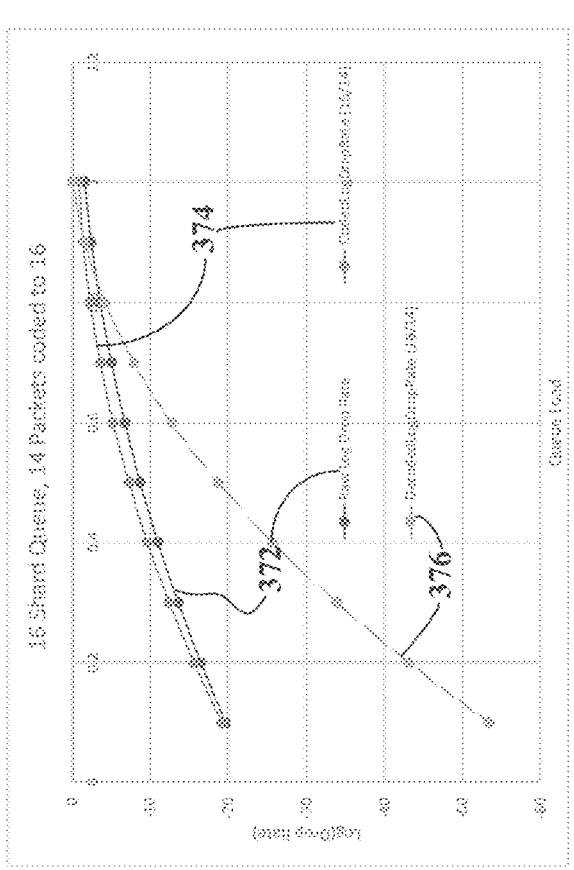
FIG. 3E shows a second example of performance of a data communication implementation in a data center in accordance with various aspects described herein.
Figure 3D:
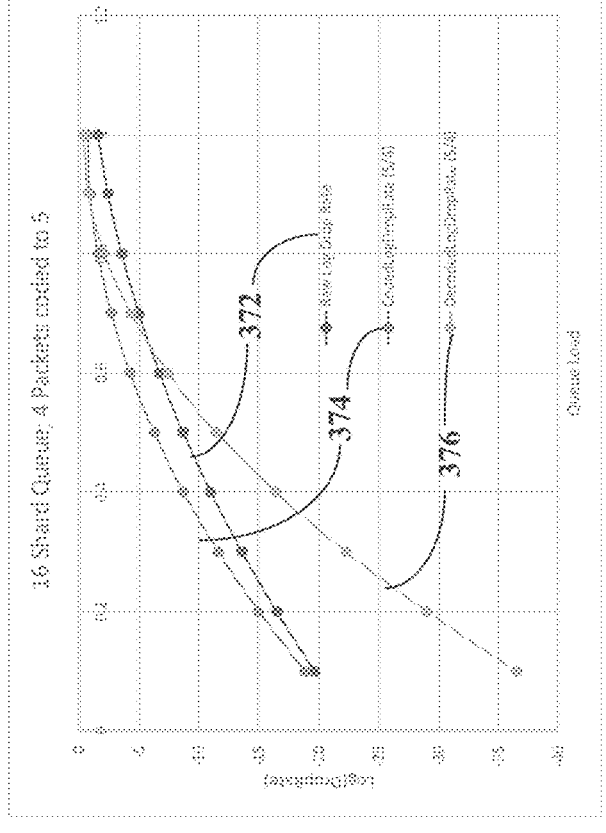
FIG. 3D shows a first example of performance of a data communication implementation in a data center in accordance with various aspects described herein.

FIG. 3D shows a first example of performance of a data communication implementation in a data center in accordance with various aspects described herein. Similarly, FIG. 3E shows a second example of performance of a data communication implementation in a data center in accordance with various aspects described herein. FIG. 3D and FIG. 3E show log (drop rate) on the ordinate and queue load on the abscissa.

FIG. 3D shows a data center example with four data shards mapped to five coded shards. FIG. 3D shows an example performance of a network with a 16 shard queue, but other queue depths produce very similar load cross-overs. In FIG. 3D, line 372 shows expected performance with uncoded network, while line 374 shows expected drop rate when extra coding shards are added to provide 1-shard drop tolerance, i.e. line 374 is a horizontally scaled line 372 by factor 5/4. Line 376 shows how original data shards can be recovered when 1 shard drops occur. This example illustrates that coding helps if queue load is below 60%, in this example.

However, as overhead becomes smaller, network coding performance improves. An example, shown in FIG. 3E, illustrates coding with 14 raw shards, 16 coded shards and 2 shard correction capability. If coding overhead is decreased and code 14 shards into 16 (tolerant to 2 drops), coding shows benefit to 80% queue load, as shown in FIG. 3E.

Figure 4:
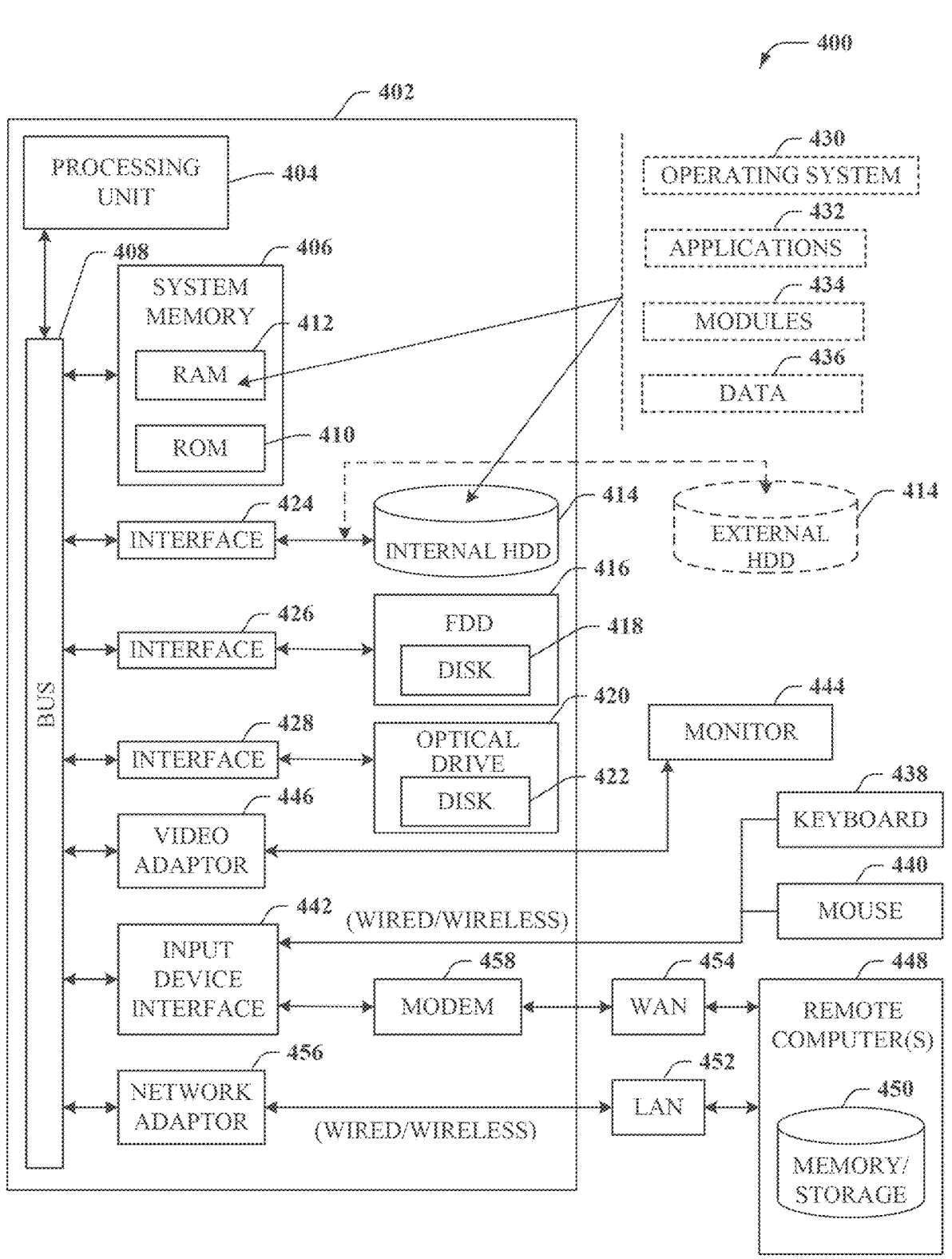
FIG. 4 is a block diagram of an example, non-limiting embodiment of a computing environment in accordance with various aspects described herein.

FIG. 4 is a block diagram of an example, non-limiting embodiment of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in the implementation of data source 102 data destination 104, data sharding module 106, and data recovery module 110 of FIG. 1 as well as ingress node 302 and egress node 304 of FIG. 2. Each of these devices can be implemented via computer-executable instructions that can run on one or more computers, and/or in combination with other program modules and/or as a combination of hardware and software. For example, computing environment 400 can facilitate in whole or in part receiving data for transmission to a remote receiver, splitting the received data into a plurality of cells or shards and transmitting the cells or shards over a diverse set of paths to the remote receiver for reassembly of the original data. Similarly, computing environment 400 can facilitate in whole or in part receiving data shards or cells over a diverse set of paths, communicated from a remote transmitter, and reassembling the data shards or cells into blocks or frames or packets to match the original data.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CDROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

As used herein, the terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. A classifier is a function that maps an input attribute vector, $x=(x_1, x_2, x_3, x_4 \ldots x_n)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving, at a first network endpoint, one or more units of data for transmission to a destination at a second network endpoint, the destination being one destination of a plurality of network destinations;

accumulating the one or more units of data into a block of data for transmission to the destination at the second network endpoint, the accumulating being according to the destination as a common destination for the one or more units of data among the plurality of network destinations;

splitting the one or more units of data into a plurality of data shards, wherein the splitting is according to a key to define partitioning of the one or more units of data into the plurality of data shards;

selecting a plurality of diverse physical paths for communication of information between the first network endpoint and the destination at the second network endpoint for data security during the communication of information;

adding to each data shard of the plurality of data shards a header including information defining the respective physical path of the plurality of diverse physical paths for each data shard; and communicating the plurality of data shards from the first network endpoint to the destination at the second network endpoint, wherein the communicating comprises providing a respective data shard of the plurality of data shards to a respective physical path of the plurality of diverse physical paths according to the information defining the respective physical path, forming a terminated security service between the first network endpoint and the second network endpoint to increase data security during the communicating.

2. The device of claim 1, wherein the operations further comprise:

encrypting at least some data shards of the plurality of data shards, forming encrypted data shards; and communicating the encrypted data shards over at least one physical path of the plurality of diverse physical paths.

3. The device of claim 2, wherein the encrypting at least some data shards comprises:

selecting a subset of data shards of the plurality of data shards, forming shard data for encryption; and applying a multi-path digital encryption algorithm to the shard data for encryption.

4. The device of claim 2, wherein the operations further comprise:

selecting a single data shard of the plurality of data shards for encryption, forming an encrypted data shard; and communicating the encrypted data shard and other data shards of the plurality of data shards over respective physical paths of the plurality of diverse physical paths.

5. The device of claim 1, wherein the operations further comprise:

applying an error correction algorithm to respective data shards of the plurality of data shards, forming error corrected data shards; and communicating the error corrected data shards to the destination on respective physical paths of the plurality of diverse physical paths.

6. The device of claim 1, wherein the operations further comprise:

applying a respective unique label to each respective data shard of the plurality of data shards, wherein each respective unique label corresponds to a unique respective physical path of the plurality of diverse physical paths; and providing each respective data shard to each physical data path according to each respective unique label.

7. The device of claim 1, wherein the operations further comprise:

selecting a unique optical fiber of an optical network; and assigning the unique optical fiber as a respective physical path of the plurality of diverse physical paths.

8. The device of claim 1, wherein the operations further comprise:

selecting a unique wavelength of a wavelength-division multiplexing communication system; and assigning the unique wavelength as a respective physical path of the plurality of diverse physical paths.

9. The device of claim 1, wherein the operations further comprise:

selecting a unique radio resource of a radio communication system; and assigning the unique radio resource as a respective physical path of the plurality of diverse physical paths.

10. The device of claim 9, wherein the selecting a unique radio resource comprises:

selecting a unique radio frequency of the radio communication system as the unique radio resource.

11. A non-transitory machine-readable medium, comprising executable instructions that, when executed by a processing system including a processor, facilitate performance of operations, the operations comprising:

receiving source frames of data at a network device, the network device forming a first network endpoint;

identifying destinations of the source frames of data;

accumulating source frames of data having a common destination at a destination network device, forming common frames of data, the destination network device forming a second network endpoint;

splitting the common frames of data into a plurality of shards based on a key, the key used to specify a number of data bits contained in shards of the plurality of shards;

selecting a plurality of diverse network paths for communication of information between the network device and the destination network device; and communicating the plurality of shards from the network device over the plurality of diverse network paths for reception of the plurality of shards at the destination network device and for reassembly at the destination network device into received frames of data, wherein the received frames of data match the source frames of data, thus forming a terminated point to point security service between the first network endpoint and the second network endpoint to increase data security during the communicating.

12. The non-transitory machine-readable medium of claim 11, wherein the splitting the common frames of data into the plurality of shards comprises:

splitting the common frames of data into the plurality of shards using a key-based splitting algorithm.

13. The non-transitory machine-readable medium of claim 11, wherein the communicating the plurality of shards over the plurality of diverse network paths comprises:

applying an error correction coding algorithm to the plurality of shards to facilitate recovery of the plurality of shards at the destination network device.

14. The non-transitory machine-readable medium of claim 11, wherein the communicating the plurality of shards over the plurality of diverse network paths comprises:

adding to each shard of the plurality of shards a header, the header including information defining a unique path for the each shard of the plurality of diverse network paths.

15. The non-transitory machine-readable medium of claim 11, wherein the communicating the plurality of shards over the plurality of diverse network paths comprises:

selecting a subset of the plurality of diverse network paths for encryption, forming selected paths;

assigning selected shards of the plurality of shards to the selected paths; and encrypting the selected shards for transmission over the selected paths.

16. A method, comprising:

receiving, by a processing system including a processor, at a destination network device including the processing system, data shards from a diverse plurality of physical links, the diverse plurality of physical links selected for data security during communication of the data shards, the data shards received over the diverse plurality of physical links from a source network device, the source network device forming a first network endpoint and the destination network device forming a second network endpoint, the first network endpoint and the second network endpoint forming a terminated, point to point security service between network endpoints to increase the data security during the communication of the data shards;

identifying, based on header information of the data shards, a destination of a source frame of data corresponding to the data shards, accumulating, based on the destination, the data shards corresponding to the destination to form a source block of data, wherein the accumulating is based on the header information of the data shards;

reassembling, by the processing system, the data shards into a block of data, the block of data matching the source block of data at the source network device, wherein the reassembling comprises ordering bits of the data shards using a key, the key matching a data splitting key used to partition the source block of data at the source network device;

determining, based on the key, a number of data bits contained in the data shards used to partition the source block of data at the source network device; and communicating, by the processing system, the block of data from the destination network device to a data destination, the data destination in data communication with the destination network device.

17. The method of claim 16, comprising:

decrypting, by the processing system, at least some data shards prior to the reassembling the data shards into the block of data.

18. The method of claim 16, wherein the reassembling the data shards into the block of data comprises:

identifying, by the processing system, a plurality of frames, the plurality of frames corresponding to frames of the source block of data at the source network device; and organizing, by the processing system, data of the block of data into frames of the plurality of frames.

19. The method of claim 16, wherein the receiving the data shards from a diverse plurality of physical links comprises:

demodulating, by the processing system, a plurality of wavelengths of an optical network, wherein the optical network provides data communication between the source network device and the destination network device.

20. The method of claim 19, wherein the demodulating the plurality of wavelengths comprises:

receiving, by the processing system, optical signals on a plurality of optical fibers of the optical network, the optical signals conveying the data shards from the source network device; and demodulating, by the processing system, one or more wavelengths of the plurality of wavelengths on each optical fiber of a plurality of optical fibers of the optical network.

* * * * *